(12) United States Patent
Amauba et al.

(10) Patent No.: US 7,996,377 B2
(45) Date of Patent: Aug. 9, 2011

(54) CIM DATA QUARANTINE

(75) Inventors: Aaron P. Amauba, Portland, OR (US); Kevin T. Hsieh, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 12/268,606

(22) Filed: Nov. 11, 2008

(65) Prior Publication Data

US 2010/0121827 A1    May 13, 2010

(51) Int. Cl.
G06F 17/30    (2006.01)
(52) U.S. Cl. .......................... 707/705; 705/781
(58) Field of Classification Search .............. 707/705, 707/781
See application file for complete search history.

(56) References Cited

U.S. PATENT DOCUMENTS

| | | | | |
|---|---|---|---|---|
| 7,849,055 | B2 * | 12/2010 | Banerjee et al. | 707/609 |
| 2003/0172088 | A1 * | 9/2003 | Mandal et al. | 707/200 |
| 2007/0210162 | A1 * | 9/2007 | Keen et al. | 235/451 |

OTHER PUBLICATIONS

DS Open Application Programming Interface 5.3 Installation and Reference, Dec. 6, 2007, 201 pages.
IBM CIM Agent for DS Open API 5.1, 1 page Sep. 12, 2008.
IBM CIM Agent for DS Open API FAQ, 4 pages, Dec. 14, 2007.

* cited by examiner

*Primary Examiner* — John Breene
*Assistant Examiner* — Thu-Nguyet Le
(74) *Attorney, Agent, or Firm* — Steven Bennett

(57) ABSTRACT

One aspect of the present invention includes performing a quarantine of inaccessible data within a CIM dataset that is managed by a storage service, and a recovery of this data within the CIM dataset once it becomes accessible. In one embodiment, after a first request is made through a CIM agent to the inaccessible data managed by a storage service, the storage service is quarantined within the CIM dataset. This includes terminating any active threads to the service and preventing new threads from accessing the service. Accordingly, the data is hidden from subsequent requests with the CIM agent and any requests to the inaccessible data are prevented. The storage service is then queried so that when the data becomes accessible, the device services for the storage service are restarted. Once restarted, new threads within the CIM agent are able to access the data within the storage service.

15 Claims, 9 Drawing Sheets

CIM DATA QUARANTINE

FIELD OF THE INVENTION

The present invention generally relates to data operations performed within a storage system. The present invention more specifically relates to the control of access to datasets and data components in a storage system with use of a Common Information Model (CIM) agent.

BACKGROUND OF THE INVENTION

CIM is an object model used to represent managed systems with a common set of objects and relationships, and is maintained by the Distributed Management Task Force (DMTF). CIM agents exist in the art which manage interactions with storage elements and the data within these storage elements. For example, the role of the IBM® DS8000/DS6000 storage system CIM agent is to maintain a global space (or a set of spaces) of CIM data representing the configuration, capabilities, and services of its storage devices. The space of CIM data is then presented to CIM clients. In the DS8000/6000 CIM agent implementation, the CIM agent is designed to support many requests from many CIM clients against many devices. During normal operation, the CIM agent is servicing client requests in addition to maintaining worker threads to the devices it is managing.

In a typical storage system CIM agent implementation, all operations related to a device (worker thread activity, client requests, performance statistics polling, and the like) are contained in a single service. These operations are hidden from CIM clients because the CIM agent presents a single global service that contains all services for all devices. This is because the CIM agent does not know what portion of the total dataset a CIM client will request, as it may be a subset or it may be all of the data. A single global service containing all data and capabilities of all devices managed is representative of the CIM data presented to CIM clients. For example, FIG. 1 represents what an example total dataset of CIM data 100 might look like in a storage system existing in the prior art.

What the CIM agent must do is maintain a logical translation between CIM data and the device the data is populated from. FIG. 2 further illustrates how different pieces of CIM data may come from different devices 211, 212, 213 and the logical mappings 221, 222, 223 the CIM agent must maintain within an example storage system existing in the prior art. As mentioned above, the CIM agent does not know what portion of the data that a client may request, because the CIM protocol allows a client to ask for many subsets of the dataset. For example, a client may request all volume data. In the example depicted in FIG. 2, a request for all volume data would require the CIM agent to access all three devices 211, 212, 213.

The problem occurs when a device fails or partially fails. In this case, a subset of the CIM data is now inaccessible or unusable. FIG. 3 illustrates how the total failure of a single device 213 would affect the CIM Data in a system existing in the prior art. If a CIM client requested volume data from the CIM agent in this state, the request would either fail or take longer than expected, because the client happened to request a subset of the CIM data that included CIM data from the defective device.

FIG. 4 similarly illustrates a single component within a storage device (an array 401) failing and how this failure would affect the CIM data in a system existing in the prior art. As depicted in FIG. 4, a CIM client attempting to request a CIM dataset that contains the defective CIM data will have this request fail.

Because of the nature of storage devices, when failures occur, there may be long latencies involved. Timeout conditions can take up to 15 or even 20 minutes to elapse. Once a failed device is discovered, it is undesirable to allow multiple requests to a failed Storage Device to continue. Thus, all CIM client requests will suffer latency times because the CIM agent will continue to attempt to collect data from the defective device.

In the volume example depicted in FIG. 3, every client request for data from volumes would either not be serviced or take longer than the client is willing to wait. During normal operations multiple CIM client requests are accessing various subsets of the CIM data. If the device fails, all CIM client requests that happen to request some part of the affected CIM data will be adversely affected. To a CIM client it would appear that random requests to the CIM agent seem to take longer than expected or would unexpectedly fail. In addition to the impact to CIM clients, the CIM agent also wastes cycles attempting to perform operations on a defective device (worker threads, servicing CIM client requests, etc.), slowing all operations in the CIM agent down. This entire problem is exacerbated because typically the set of CIM data is large and complex, and a single device often represents a significant portion of this data.

There is no known mechanism to automatically manage the set of CIM data that is affected by a defective device. The only option is to manually de-configure the defective device from the CIM agent. There is no way for the CIM client to know what portion of the CIM data is causing the failures and to avoid requesting it. Further, after the device is repaired, manual intervention is required to re-configure the device into the CIM agent.

BRIEF SUMMARY OF THE INVENTION

One aspect of the present invention enables a CIM agent to internally detect when CIM data becomes undesirable due to device failure. The error may be found during a CIM client request or some internal CIM agent process. After an error is detected, the CIM agent responds by quarantining, removing, or hiding the affected CIM data and any other dependent data from the total set of CIM data so that future CIM client requests are not impacted. Moreover, a further aspect of the present invention provides a CIM agent with a mechanism to modify or remove the defective CIM data for failed devices, in addition to the ability to return that CIM data to its original state after the defective device has been repaired.

Not allowing CIM clients to be susceptible to repetitive long latencies in CIM requests has obvious advantages. Removing the CIM data that has long latencies within the total set of CIM data that CIM clients can see will also prevent repeated accidental requests to objects that have long latencies. In addition, a mechanism which removes the need for manual intervention to remove/de-configure a failed device and reconfigure it after repair also has obvious advantages.

In one embodiment, an operation for performing a quarantine of inaccessible data with a CIM agent in a storage system is applied to a CIM agent that accesses a CIM dataset contained within the storage system. This CIM agent includes a storage service which manages data that comprises a subset of the CIM dataset. In further embodiments, the data managed by the storage service is contained within a storage device, and the data managed by the storage service is contained within a component within a storage device.

In the case that access is requested to the data managed by the storage service through the CIM agent, but the data managed by the storage service is inaccessible by the CIM agent, the operation responds by quarantining the storage service to prevent current and subsequent access to the data. The quarantine process involves stopping device services for the storage service, and terminating any active threads within the CIM agent which are attempting to access the storage service. Additionally, the quarantine includes preventing new threads within the CIM agent from accessing the storage service. This hides the data managed by the storage service from subsequent requests through the CIM agent.

Once quarantined, the storage service is queried at a predefined interval to determine if the data in the storage service has become accessible by the CIM agent. Once it is determined that the data in the storage service is accessible, the quarantine of the storage service within the CIM dataset is removed, including restarting device services for the storage service, and enabling new threads within the CIM agent to access the storage service and view the data managed by the storage service.

In a further embodiment, quarantining the storage service within the CIM dataset includes hiding any data dependent on the storage service from subsequent requests through the CIM agent. In still a further embodiment, if access is requested through the CIM agent to a collection of data that comprises one or more available storage services and the quarantined storage service, then any non-quarantined data in the collection of data is retrieved. This includes providing a subset of the requested collection of data by retrieving all accessible data from the one or more available storage services and not attempting to retrieve inaccessible data managed by the quarantined storage service.

DETAILED DESCRIPTION OF THE INVENTION

Figure 1:
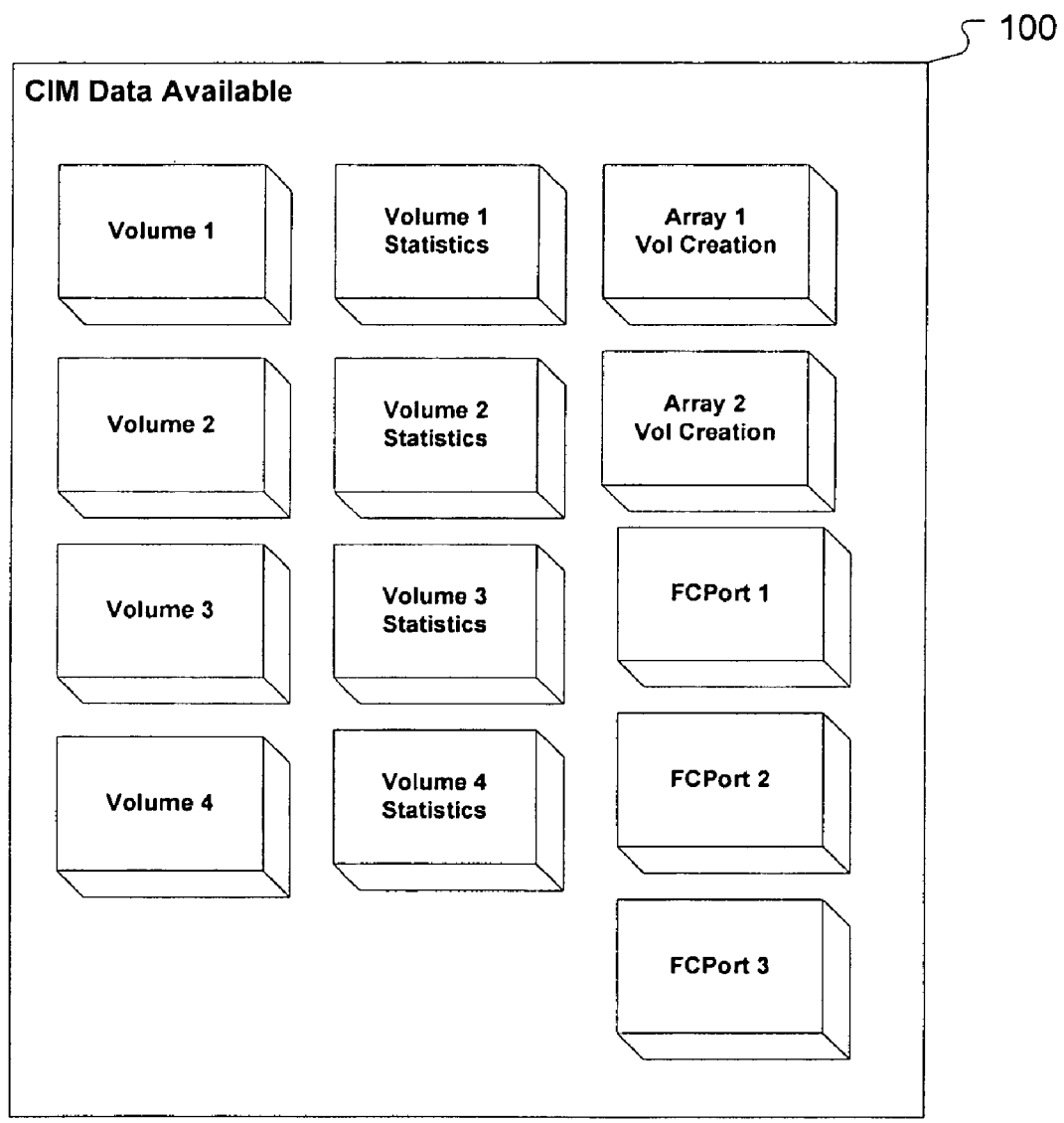
FIG. 1 illustrates an example of a dataset of CIM data within a storage system existing within the prior art.
Figure 2:
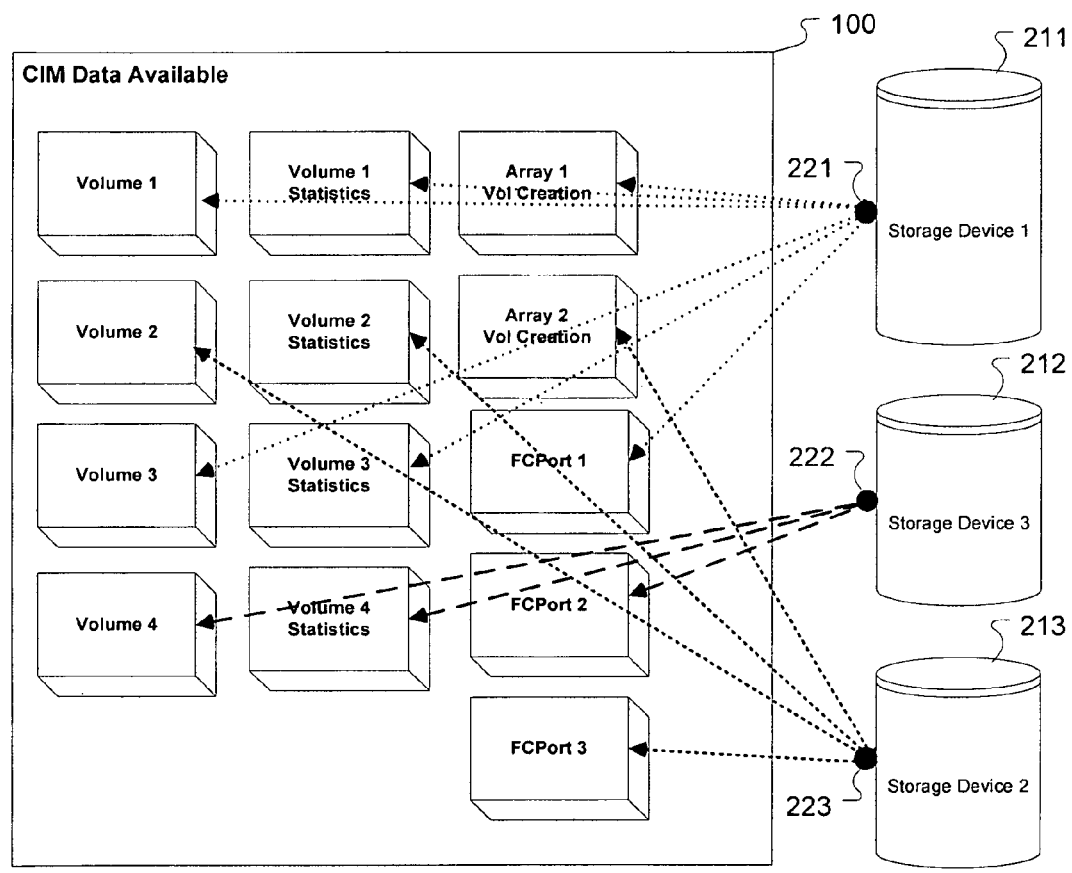
FIG. 2 illustrates an example of a logical mapping for a dataset of CIM data within a storage system existing within the prior art.
Figure 3:
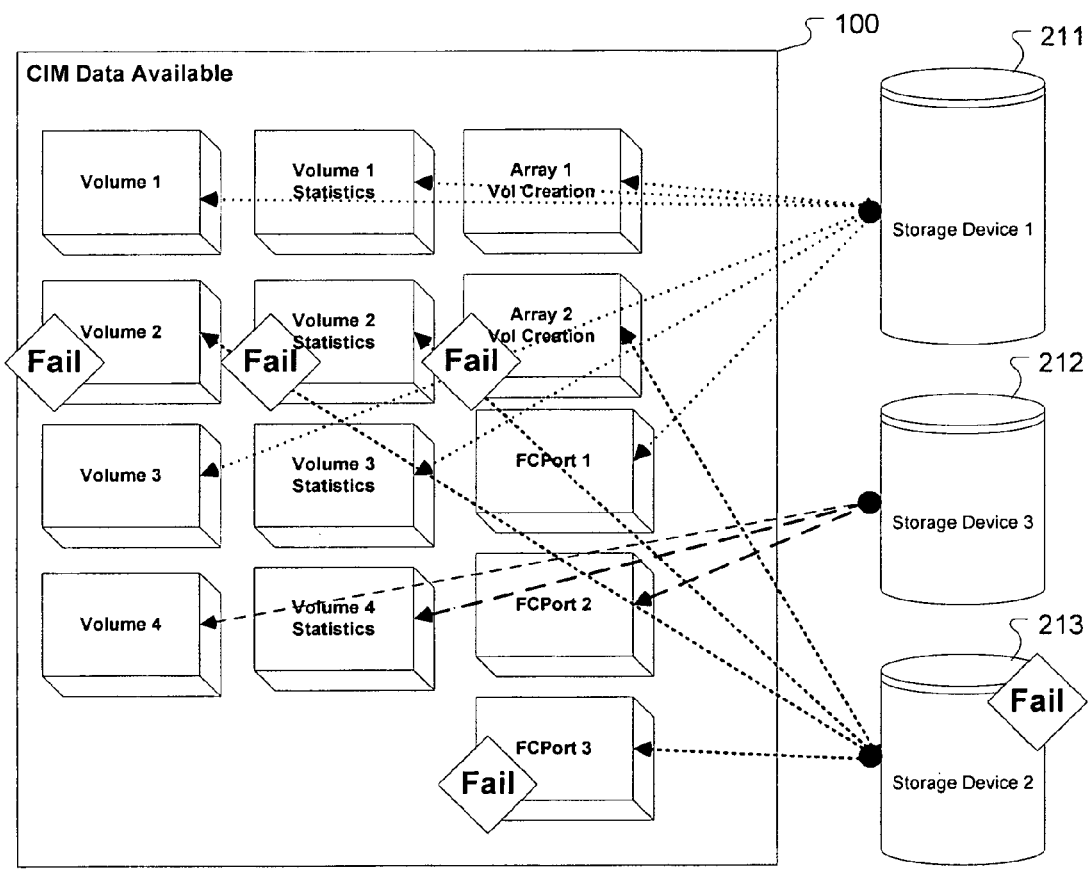
FIG. 3 illustrates an example of a failure of a storage device in a dataset of CIM data within a storage system existing within the prior art.
Figure 4:
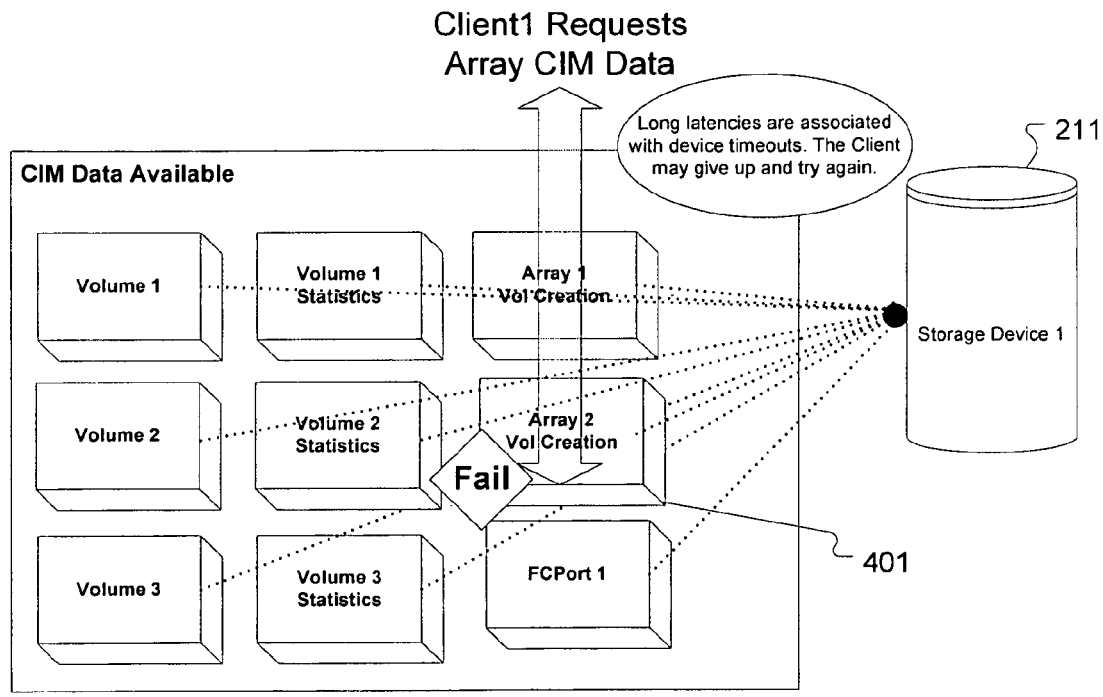
FIG. 4 illustrates an example of a request for array CIM data from a failed array within a storage system existing within the prior art.

One aspect of the present invention includes responding to failures of storage devices and components by quarantining and hiding any defective storage services within the dataset accessible by the CIM agent. One embodiment of the present invention uses a logical translation between CIM data and storage devices and components already maintained by the CIM agent to predict what set of the CIM data is defective if a failure on the device occurs. For example, as is occurring in the scenario depicted in FIG. 4, a first client requests Array CIM data from a CIM agent managing a single storage device, but one of the arrays is defective and unavailable.

With use of this embodiment of the present invention, after the CIM agent identifies that an array is defective, the CIM agent uses this knowledge to remove or hide the CIM data for that array and all dependent data from the total set of CIM data available to future CIM client requests. Thus, using the example of the failed array in FIG. 4, if the array is in a defective state, any volumes that originate from that array and their associated CIM data will also be defective. At this point the CIM agent will use the relevant information to identify what CIM data is affected and remove/hide it from the total set of CIM data.

Figure 5:
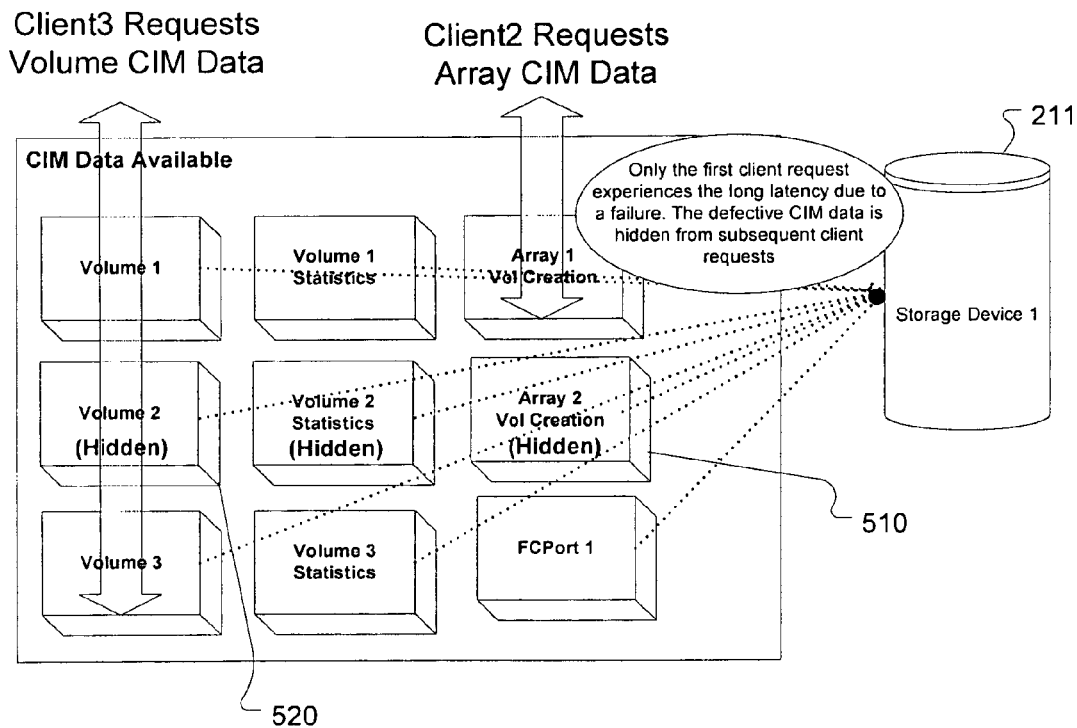
FIG. 5 illustrates an example of requests for volume and array CIM data from a CIM dataset containing a failed array according to one embodiment of the present invention.

FIG. 5 illustrates subsequent requests for CIM data from a second and third client according to one embodiment of the present invention. As is depicted, the second client request (for array CIM data) will succeed, because Array 2 510 was recognized after the first client request as being defective or unavailable. Similarly, the third client request (for volume CIM data) will also succeed with the contents of volume 2 520 hidden. Thus, the inaccessible data that is "quarantined" or hidden may even enable future CIM client requests to access any remaining CIM data on the storage device 211 without being impacted by any defective portions of the CIM data.

Figure 6:
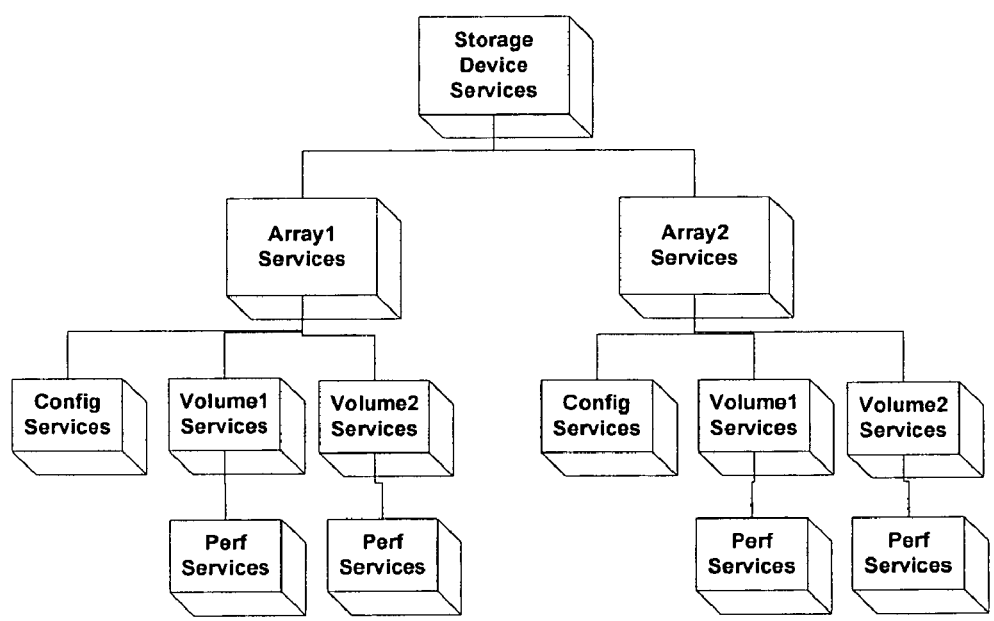
FIG. 6 illustrates an example hierarchy of a CIM dataset within a storage system according to one embodiment of the present invention.

A further aspect of the present invention represents the logical connection between CIM data and the devices storing the data as services with relationships to each other that the CIM agent uses to fulfill CIM requests. A service would be a software entity within the CIM agent that performs work with the device to populate some portion of the total CIM data set. For example, in one embodiment, a top-down hierarchical-type relationship 600 may exist as is illustrated in FIG. 6.

Figure 7:
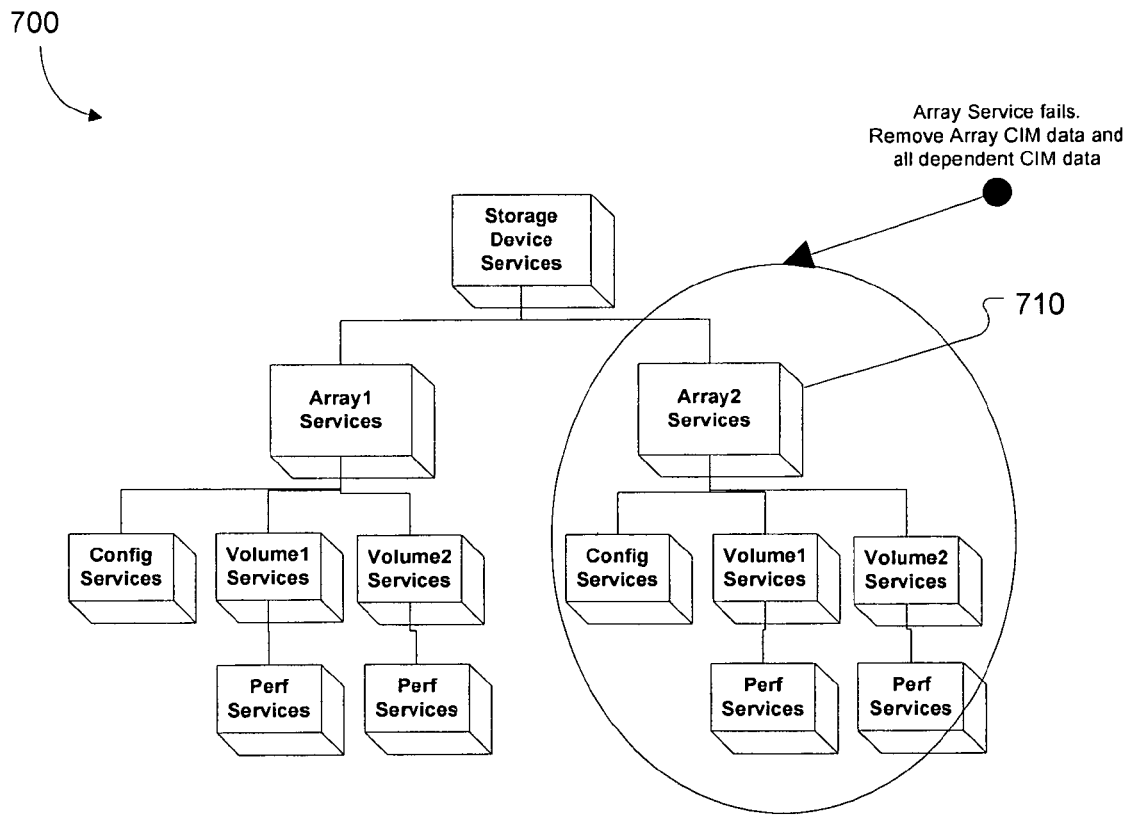
FIG. 7 illustrates an example of a failure of an array service within a hierarchy of a CIM dataset within a storage system according to one embodiment of the present invention.

Through use of hierarchy relationships, when an error is detected in a particular service, the CIM agent would remove or hide that CIM data along with any other dependant CIM data. For example, as depicted in FIG. 7, an array service (Array2 710) within a hierarchical device services hierarchy 700 has failed. The CIM agent responds to the failure of this service by removing the Array2 CIM data and all of its dependent CIM data.

While the defective CIM data is hidden from the total set of CIM data, the CIM agent will periodically check the device to see if it can access the information needed to generate the defective CIM data. Once it has discovered the device has been repaired, the CIM agent may be configured to make the previously removed/hidden CIM data available again to the total set of CIM data.

The implementation that revives the portion of the CIM data that was identified as defective can use the same mechanism to determine which services to attempt to revive. Once the services that have been identified as bad are located, they can be used to determine when the device has been repaired. Once they are capable of completing work successfully, the CIM data that they logically represent can be returned to the total set of CIM data.

Figure 8:
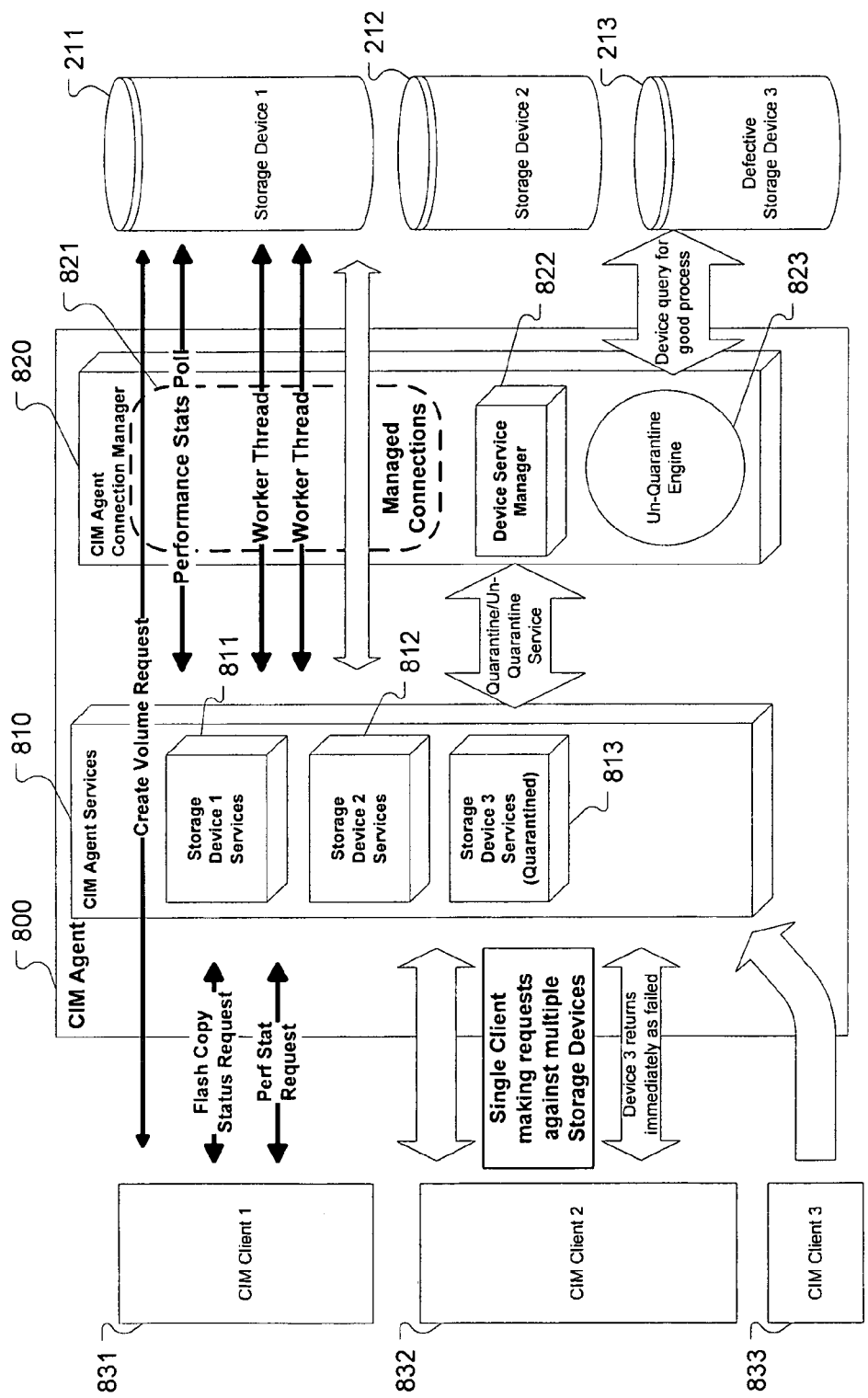
FIG. 8 illustrates an example configuration of a CIM agent utilizing a process to quarantine and recover data within a storage device in a storage system according to one embodiment of the present invention.

FIG. 8 illustrates an interaction of services and devices through use of an example CIM agent 800 according to one embodiment of the present invention, with the logical representation between CIM data and devices kept at a minimum. In this embodiment, a CIM agent 800 presents a single agent service 810, composed of three services 811, 812, 813, one for each device 211, 212, 213. Storage Device 3 213 is depicted in FIG. 8 as being defective. Clients 831, 832, 833 each making a variety of requests to the CIM agent and the services within the CIM agent. On the right of FIG. 8 are various worker threads and requests on behalf of client requests which end up going to the appropriate devices.

As illustrated, the CIM agent 800 uses a logical translation between CIM data and the defective device (i.e., the service 813 managing the device 213) to determine what set of CIM data to remove from the global set of CIM data. Once the subset of data from the defective storage device 213 has been hidden, any client requesting its data does not incur any latency. Instead, the client receives an immediate bad response from the CIM agent, as the CIM agent 800 does not waste cycles attempting to fulfill the client request by sending a request to the device that is already known as defective.

In this embodiment, the internal components of the CIM agent implement various operations to quarantine and un-quarantine a storage device. FIG. 8 further depicts this mechanism utilized to recover or unhide the hidden CIM data, the Unquarantine Engine 823, and how it utilizes the same service used to hide the data to determine if the device has recovered. The primary internal component (which in this embodiment will be referred to as the "Connection Manager" 820) performs three primary functions:

Managed Connections 821: Maintains a collection of connections to all managed devices along with their status (Good/Failed). All threads/processes gain access to the managed devices from the Connection manager.

Service Manager 822: Quarantines/Removes/hides and Un-Quarantines/adds/unhides services for defective/repaired devices from/to the global service presented to the CIM clients. Failed device CIM Data are hidden from CIM clients.

Un-Quarantine Engine 823: Runs a process that determines if the failed devices have been repaired. This process is repeated to continually query the device to detect when the device has returned to normal operation.

As shown, the CIM clients 831, 832, 833 make requests to the CIM agent services 810, which returns data from unquarantined services as requested. Thus, as CIM client 1 831 sends commands to create a volume, request the status of a flash copy, and perform a performance statistics request, the various functions of the CIM agent services 810 perform actions upon the storage devices. Similarly, as CIM client 2 832 makes requests against multiple storage devices, device 1 211 and device 2 212 return data normally, whereas storage device 3 213 returns immediately as failed.

Figure 9:
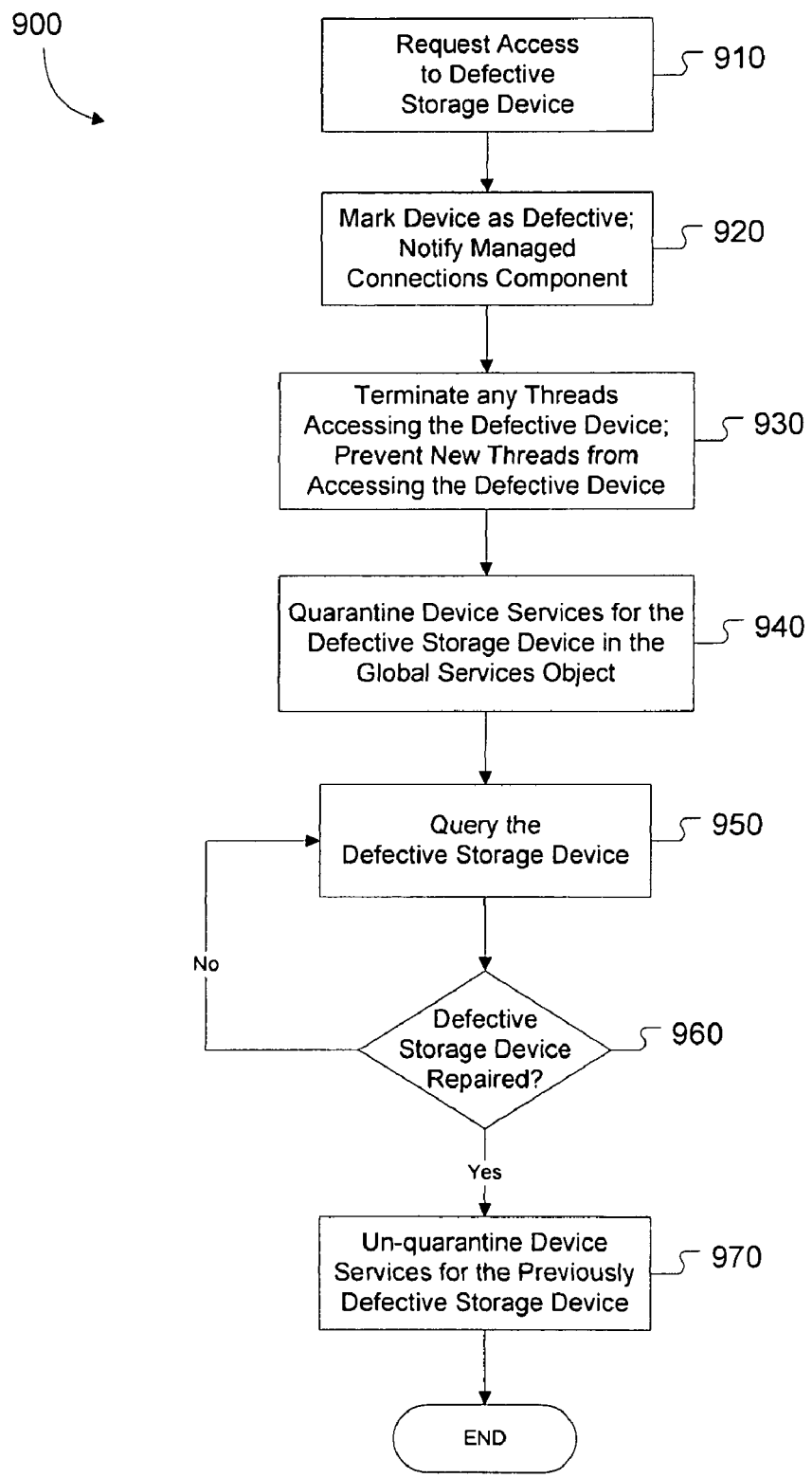
FIG. 9 illustrates a flowchart depicting an operation for performing a quarantine of inaccessible data with a CIM agent in a storage system according to one embodiment of the present invention.

FIG. 9 illustrates a flowchart 900 for a process of performing a quarantine and recovery of inaccessible data with a CIM agent in a storage system according to one embodiment of the present invention. In combination with the example system and device configuration scenario depicted in FIG. 8, the following process describes the steps taken to quarantine and restore a defective storage device for use with the CIM agent. As also illustrated within FIGS. 5, 6, and 7, those skilled in the art will recognize that the following quarantine and recovery operations for a storage device may also be performed with an array service, a volume service, or similar types of device component services within a CIM data agent.

First, as in step 910, a thread or process requests access to a storage device. For example, in the system of FIG. 8, this would involve a request to defective Storage Device 3 213. This thread/process fails because the device is defective. In step 920, the 'Managed Connections' component 821 is notified and the connection to the device is marked as defective.

Next, as in step 930, the 'Managed Connections' component 821 terminates any other threads and processes that are already accessing the defective device and prevents any new threads and processes from accessing the defective device. Current and new threads and processes are simply sent back to the sender immediately as being failed, rather than waiting a period of time for a device failure/timeout to occur.

As in step 940, the 'Device Service Manager' component 822 quarantines the device services for storage device 3 213 in the global services object 810 of the CIM agent. This will hide CIM data of the failed device from any CIM clients. (Obviously, the status of the device is not hidden). If any CIM client requests for the failed storage device are sent to the CIM agent, they are immediately returned as failed (because the CIM data does not exist). This operation will also shutdown any internal threads or processes (worker threads, performance statistics polls, etc.) for the failed storage device.

As in step 950, The 'Un-Quarantine Engine' component 841 continually queries the failed storage device until it discovers that the failed device is repaired. After the 'Un-Quarantine Engine' 823 discovers the defective storage device is repaired as in step 960, the 'Device Service Manager' 822 component un-quarantines the device services for the previously defective storage device in the global service object in step 970, and worker and performance statistics polls are restarted for the device. CIM Data for the previously defective storage device will now be available for CIM clients.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for performing a quarantine and recovery of inaccessible data with a Common Information Model (CIM) agent in a storage system, comprising:
   providing a CIM agent to access a CIM dataset within a storage system, the CIM agent including a storage service managing data within a subset of the CIM dataset;
   requesting access, with a first request through the CIM agent, to the data managed by the storage service, wherein the data managed by the storage service is inaccessible by the CIM agent;
   quarantining the storage service within the CIM dataset, including:
      stopping device services for the storage service;
      terminating any active threads within the CIM agent which are attempting to access the storage service; and
      preventing new threads within the CIM agent from accessing the storage service, thereby hiding the data managed by the storage service from subsequent requests through the CIM agent;
   querying the storage service at a predefined interval to determine if the data in the storage service is accessible by the CIM agent; and
   removing the quarantine of the storage service within the CIM dataset responsive to determining that the data in the storage service is accessible, including:
      restarting device services for the storage service; and
      enabling new threads within the CIM agent to access the storage service and view the data managed by the storage service.

2. The method as in claim 1, further comprising:
   requesting access, with a second request through use of the CIM agent, to a collection of data within the CIM dataset, the collection comprising one or more available storage services and the quarantined storage service; and
   providing a subset of the requested collection of data by retrieving all accessible data from the one or more available storage services and not attempting to retrieve inaccessible data managed by the quarantined storage service.

3. The method as in claim 1, wherein quarantining the storage service within the CIM dataset further includes hiding data dependent on the storage service from subsequent requests through the CIM agent.

4. The method as in claim 1, wherein the data managed by the storage service is contained within a storage device.

5. The method as in claim 1, wherein the data managed by the storage service is contained within a component within a storage device.

6. A system, comprising:
   at least one processor; and
   at least one memory storing instructions operable with the at least one processor for performing a quarantine and recovery of inaccessible data with a Common Information Model (CIM) agent in a storage system, the instructions being executed for:
      providing a CIM agent to access a CIM dataset within a storage system, the CIM agent including a storage service managing data within a subset of the CIM dataset;
      requesting access, with a first request through the CIM agent, to the data managed by the storage service, wherein the data managed by the storage service is inaccessible by the CIM agent;
      quarantining the storage service within the CIM dataset, including:
         stopping device services for the storage service;
         terminating any active threads within the CIM agent which are attempting to access the storage service; and
         preventing new threads within the CIM agent from accessing the storage service, thereby hiding the data managed by the storage service from subsequent requests through the CIM agent;
      querying the storage service at a predefined interval to determine if the data in the storage service is accessible by the CIM agent; and
      removing the quarantine of the storage service within the CIM dataset responsive to determining that the data in the storage service is accessible, including:
         restarting device services for the storage service; and
         enabling new threads within the CIM agent to access the storage service and view the data managed by the storage service.

7. The system as in claim 6, further comprising:
   requesting access, with a second request through use of the CIM agent, to a collection of data within the CIM dataset, the collection comprising one or more available storage services and the quarantined storage service; and
   providing a subset of the requested collection of data by retrieving all accessible data from the one or more available storage services and not attempting to retrieve inaccessible data managed by the quarantined storage service.

8. The system as in claim 6, wherein quarantining the storage service within the CIM dataset further includes hiding data dependent on the storage service from subsequent requests through the CIM agent.

9. The system as in claim 6, wherein the data managed by the storage service is contained within a storage device.

10. The system as in claim 6, wherein the data managed by the storage service is contained within a component within a storage device.

11. A computer program product comprising a non-transitory computer useable medium having a computer readable program for performing a quarantine and recovery of inaccessible data with a Common Information Model (CIM) agent in a storage system, wherein the computer readable program when executed on a computer causes the computer to:
   provide a CIM agent to access a CIM dataset within a storage system, the CIM agent including a storage service managing data within a subset of the CIM dataset;
   request access, with a first request through the CIM agent, to the data managed by the storage service, wherein the data managed by the storage service is inaccessible by the CIM agent;
   quarantine the storage service within the CIM dataset, including:
      stopping device services for the storage service;
      terminating any active threads within the CIM agent which are attempting to access the storage service; and
      preventing new threads within the CIM agent from accessing the storage service, thereby hiding the data managed by the storage service from subsequent requests through the CIM agent;

query the storage service at a predefined interval to determine if the data in the storage service is accessible by the CIM agent; and remove the quarantine of the storage service within the CIM dataset responsive to determining that the data in the storage service is accessible, including:

restarting device services for the storage service; and enabling new threads within the CIM agent to access the storage service and view the data managed by the storage service.

12. The computer program product of claim 11, wherein the computer readable program when executed on a computer further causes the computer to:

request access, with a second request through use of the CIM agent, to a collection of data within the CIM dataset, the collection comprising one or more available storage services and the quarantined storage service; and provide a subset of the requested collection of data by retrieving all accessible data from the one or more available storage services and not attempting to retrieve inaccessible data managed by the quarantined storage service.

13. The computer program product of claim 11, wherein the quarantine of the storage service within the CIM dataset further includes hiding data dependent on the storage service from subsequent requests through the CIM agent.

14. The computer program product of claim 11, the data managed by the storage service is contained within a storage device.

15. The computer program product of claim 11, wherein the data managed by the storage service is contained within a component within a storage device.

* * * * *